United States Patent
Dupas et al.

(10) Patent No.: US 8,096,390 B2
(45) Date of Patent: Jan. 17, 2012

(54) DRUM BRAKE SHOE

(75) Inventors: Christophe Dupas, Palaiseau (FR);
Miguel Perez, Argenteuil (FR);
Matthieu Cornic, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 12/265,899

(22) Filed: Nov. 6, 2008

(65) Prior Publication Data
US 2009/0114491 A1 May 7, 2009

(30) Foreign Application Priority Data
Nov. 6, 2007 (FR) ...................................... 07 07811

(51) Int. Cl.
*F16D 65/02* (2006.01)
(52) U.S. Cl. ........................................ 188/2 D; 188/331
(58) Field of Classification Search .................. 188/2 D, 188/79.54–79.56, 106 A, 325
See application file for complete search history.

(56) References Cited

U.S. PATENT DOCUMENTS

| 2,924,116 A | 2/1960 | Abbott |
| 3,517,779 A | 6/1970 | Bolenbaugh |
| 6,568,513 B1 * | 5/2003 | Doolittle et al. ............. 188/331 |
| 2007/0068743 A1 * | 3/2007 | Tessitore ...................... 188/2 D |

FOREIGN PATENT DOCUMENTS

| DE | 2949506 | 7/1981 |
| FR | 2841619 | 1/2004 |
| GB | 603932 | 6/1948 |

OTHER PUBLICATIONS

FR0707811 Search Report and Written Opinion.

* cited by examiner

*Primary Examiner* — Christopher Schwartz
(74) *Attorney, Agent, or Firm* — Michael Best & Friedrich LLP

(57) ABSTRACT

Drum brake shoe, particularly for a motor vehicle, in which a brake cable (64) has an end terminal (66) for attachment to a lever (50) that acts on the shoe (4), this shoe comprising a rigid web one edge of which is formed with a cut-out (90) providing access to the cable (64) attachment end terminal (66) to make it easier to detach this cable.

13 Claims, 3 Drawing Sheets

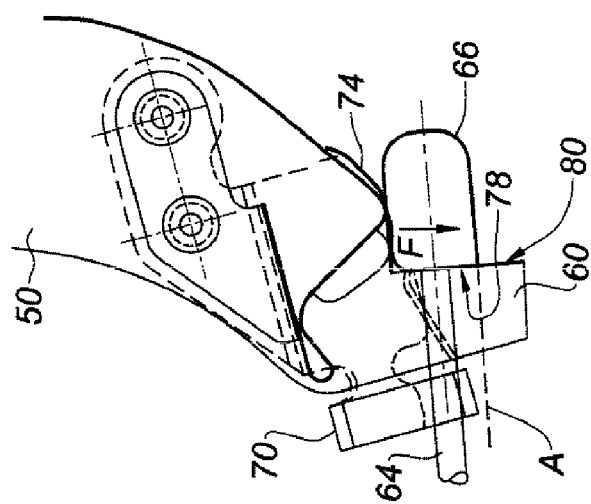
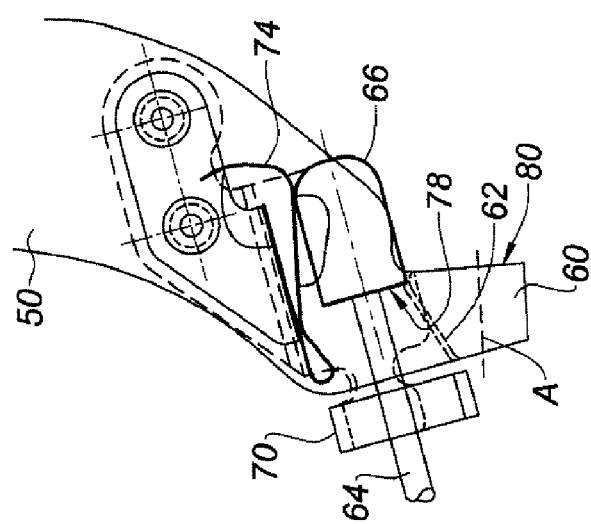
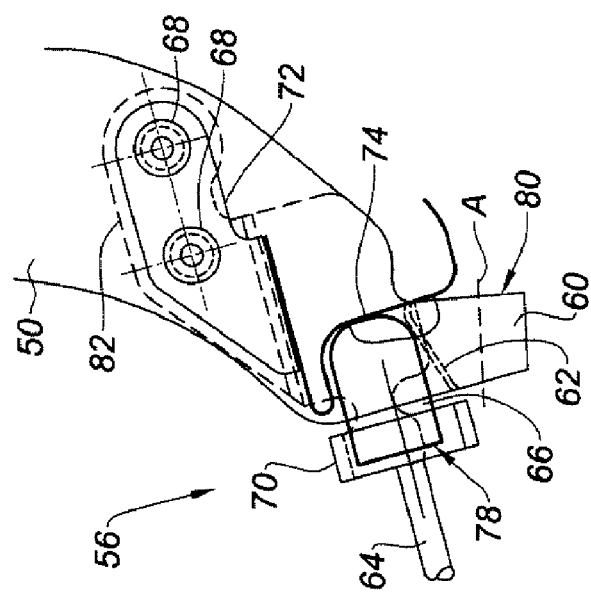

DRUM BRAKE SHOE

BACKGROUND AND SUMMARY OF THE INVENTION

The present invention relates to a drum brake shoe, particularly for a motor vehicle, and to a drum brake equipped with this shoe.

A drum brake in general comprises a fixed backplate which is perpendicular to the axis of a drum that rotates as one with a wheel, and which supports shoes fitted with arc-shaped friction linings. A cylinder-actuated main control is able to push these shoes radially outward and press the linings against the cylindrical interior face of the drum that rotates as one with the wheel, in order to brake this wheel.

To create a parking or hand brake, an additional control is provided, this comprising a cable pulled by a lever actuated by the driver. The cable slides in a sheath the end of which bears against the backplate, the end of the cable acts on a lever which pivots and multiples the force to expand (part) the shoes and apply the linings firmly against the drum.

A drum brake of this type, described in document FR-A1-2841619 comprises a device for quickly and reliably attaching the end of a cable blind to a brake lever comprising a drum that has already been fitted.

The end of the cable bears an end terminal introduced from the outside into a hole in the backplate and which slides along a duct formed at one end of the lever, at the same time pressing against a leaf spring which flexes. When the rear part of the end terminal reaches the end of the duct, the leaf spring pushes the end terminal to engage the cable in the duct. The end terminal is locked in position by the leaf spring and allows the lever to be pulled.

To remove the cable during a maintenance operation by movement in the opposite direction to the direction of fitting it. This removal is tricky to perform because the lever is located behind one of the shoes and the movement that has to be performed is fairly complicated as the operator cannot see the end terminal and does not have direct access thereto.

It is a particular object of the present invention to alleviate these disadvantages and to provide a simple, effective and economical solution to the removal of the hand brake cable.

To this end, the invention provides a drum brake shoe, this shoe comprising a rigid web and a cylindrical part that bears a friction lining, characterized in that an interior edge of the web has a cut-out providing access to a brake cable attachment end terminal.

One essential advantage of the drum brake according to the invention is the ease with which the brake cable can be removed, thanks to the cut-out in the web of the shoe which allows the cable attachment end terminal to be seen and accessed.

This cut-out has a depth extending over approximately half the width of the rigid web of the shoe and a length at least equal to its depth.

It has inclined sides such that its open end is far wider than its closed end.

It is near one end of the shoe which is capable of pivoting by bearing against a stop connected to the backplate of the drum brake.

One inclined side of the cut-out may meet this end of the shoe.

The invention also relates to a drum brake, particularly for a motor vehicle, which is fitted with a shoe of this type.

Advantageously, in this brake, one end of a lever is connected by a pivoting connection to that end of the shoe on which a main control acts and the brake cable is attached to the other end of the lever.

The brake cable slides in a sheath the end of which bears against the backplate of the brake and the cable end terminal can be attached to the lever blind when the drum is assembled.

Advantageously, to do that, that end of the lever that is attached to the cable ends in a bent tab forming a duct the axis of which is parallel to the backplate, the edge of the tab being inclined and which diverges from the axis of the duct towards the drum, the lever also comprising a ferrule for guiding the end terminal when the cable is being fitted. During mounting, the end terminal slides along the inclined edge of the duct, pressing against an elastic leaf. When the rear face of the end terminal reaches the end of the inclined edge of the duct, the elastic leaf pushes on the end terminal to engage and hold part of the cable in place in the duct.

BRIEF DESCRIPTION OF THE DRAWINGS

The invention will be better understood and further features and advantages thereof will become more clearly apparent from reading the description given hereinafter by way of example with reference to the attached drawings in which:

FIGS. 2a, 2b and 2c are detailed views illustrating how a brake cable is attached to a drum brake lever;

DETAILED DESCRIPTION

Figure 1:
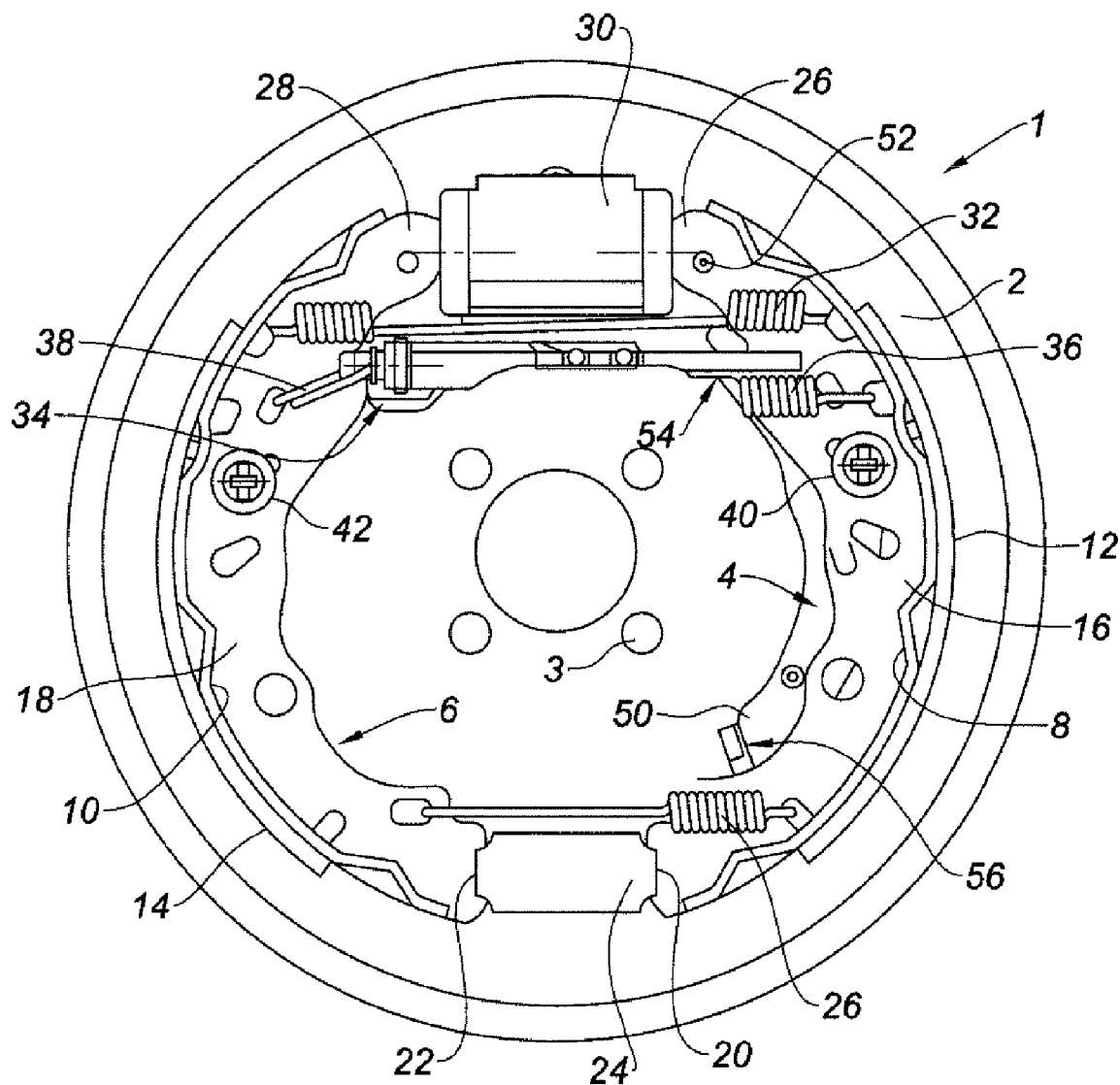
FIG. 1 is a front view of a drum brake, with the drum removed.

FIG. 1 depicts a drum brake device 1 which, in a known way, comprises a supporting backplate 2 in the form of a disk fixed to the chassis of a vehicle by screws that pass through drillings 3 positioned around a central opening through which there fits the hub of a wheel which turns a brake drum, not depicted.

The backplate 2 supports two shoes 4, 6 each comprising a part 8, 10 of cylindrical surface coaxial with the drum and onto which a friction lining 12, 14 is bonded. Each shoe comprises a rigid web 16, 18 made of sheet metal running in a plane perpendicular to the axis of the drum and connected to the cylindrical part 8, 10.

Each shoe 4, 6 can pivot about a lower end 20, 22 resting against a stop 24 connected to the backplate 2, under the effect of a main hydraulic control comprising a horizontal cylinder 30 fixed to the backplate 2 and accommodating two pistons positioned axially on each side of a fluid-tight chamber that receives pressurized oil from a supply pipe. The pistons each press against the upper end 26, 28 of a shoe in order symmetrically to generate an outward expansion force that presses the friction linings 12, 14 onto a cylindrical interior surface of the drum connected to the wheel in order to brake the rotation of said wheel.

A return spring 32, hooked via its ends onto the shoes 4, 6, applies tension to push the pistons back inside the cylinder 30 thereby driving oil out of the chamber in order to release the friction linings 12, 14 from the drum after braking. The shoes 4, 6 come to rest against stops formed on a bar 34 connected to the shoes by springs 36, 38, this bar 34 comprising an adjuster device which gradually lengthens it to compensate for the wear of the friction linings 12, 14 and thus keep the working travel of the shoes approximately constant.

The shoes are held axially on the backplate 2 by short springs 40, 42 which apply a small amount of tension between the backplate 2 and their web 16, 18.

A lever 50 used for auxiliary brake control extends in a transverse plane between the shoe 4 and the backplate 2 and pivots about a rivet 52 which connects its upper end to the end of the shoe 4. Its lower end is connected by an attachment device 56 to a cable, not depicted, sliding in a sheath the end of which bears against the backplate 2, in order to exert a tension force that moves the lever away from the drum.

At a point 54 located near to the rivet 52, the lever 50 bears against the bar 34. Pulling on the cable connected to the lever 50 causes it to pivot about the support point 54, the upper end of the lever moving away from the control cylinder 30 and via the rivet 52 driving the upper end of the shoe 4 with a stepped-down force dependent on the lengths of the lever arms. By reaction against the bar 34, the other shoe 6 is pushed towards the drum and the two shoes thus apply a force braking the wheel.

FIGS. 2a to 2c show in detail the cable attachment device 56 and the method of attachment. The lower part of the lever 50 formed by sheet metal ends in a tab bent back from the plane of the lever, forming a duct 60 the axis A of which is approximately horizontal and parallel to the backplate. The edge 62 of the sheet metal at the end of the tab is inclined and diverges from the axis A of the duct in the direction of the drum.

The brake cable 64 comprises, for attachment to the lever 50, a cylindrical end terminal 66 of a diameter greater than that of the cable and with a domed front part. The other end of the cable 64 is connected to a control system capable of exerting tension, such as a hand brake lever or an electric motor.

A ferrule 70 is formed in a metal sheet 82 fixed by rivets 68 to the lever and has an axis approximately parallel to that of the duct, so as to guide the end terminal 66 as the cable 64 is inserted during fitting. The end terminal 66 then rests against an elastic leaf 74 formed of sheet metal fixed to the lever 50 by the rivets 68, and slides along the inclined edge 62. When the rear face 78 of the end terminal 66 reaches the end of the inclined edge 62, the end terminal is pushed downward by the elastic leaf 74 and part of the cable 64 is housed and held in the closed end of the duct 60. The rear face 78 of the end terminal presses against the axial end 80 of the duct 60 and the cable 64 is ready for actuation.

Figure 3:
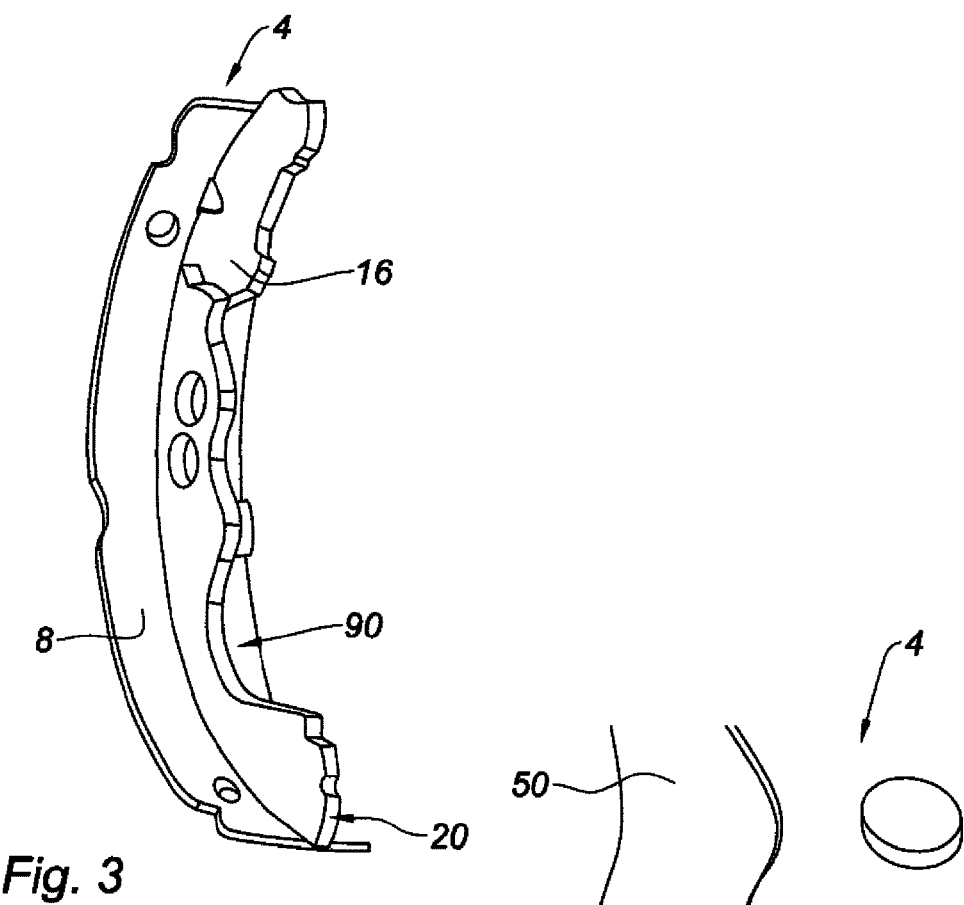
FIG. 3 is a perspective view of a shoe according to the invention.
Figure 4:
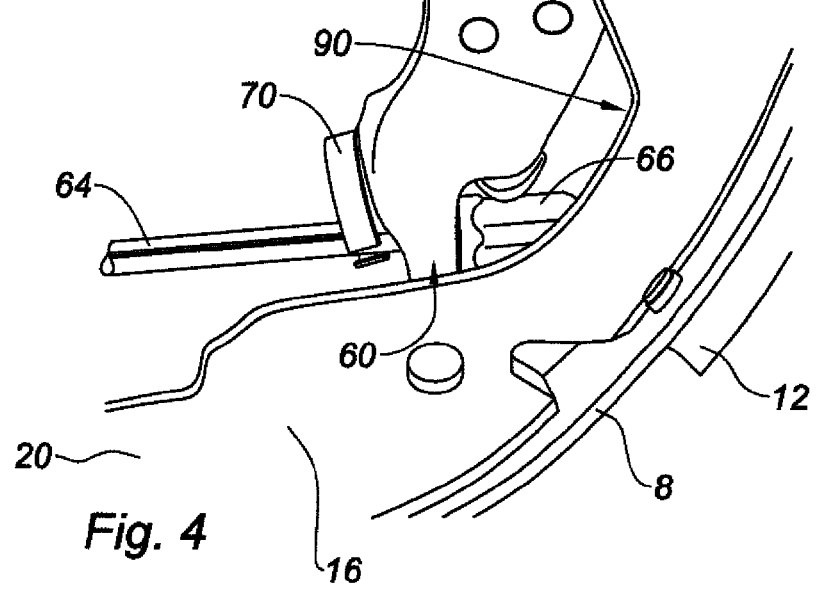
FIG. 4 is a partial view of the shoe and of the cable attachment device.

FIGS. 3 and 4 depict a shoe 4 produced according to the invention, comprising a cylindrical part 8 and a web 16 of which the edge facing towards the axis of the drum comprises a cut-out 90 near its lower part. This cut-out 90 extends radially over approximately half the width of the web 16 and circumferentially over a slightly greater distance, with inclined sides delimiting a cut-out the open end of which is far wider than its closed end. The lower inclined edge of the cut-out 90 lies near the end 20 of the shoe 4 that presses on the stop 24 fixed to the backplate 2.

In order to remove the cable 64 for maintenance purposes, the operator, having removed the brake drum, has to detach the cable 64 from the lever 50 by causing the end terminal 66 to follow a path that is the reverse of the path followed for fitting this cable. The end terminal 66 has in particular to be brought back up along the axial end 80 of the duct 60 and then moved back, this operation requiring a tool to be slipped into position in order to apply force to the end terminal.

As can be seen in FIG. 4, cable detachment is made easier by the invention because most of the end terminal 66 is accessible through the opening formed by the cut-out 90. Good sight of the end terminal allows an operator unfamiliar with the attachment system used to see how the end terminal is attached to the lever and understand how he needs to proceed.

When refitting the cable to the lever, an operator who has not received the training given to those operating on motor vehicle assembly lines can more easily ensure that the end terminal has been correctly positioned, this representing a safety factor and limiting the risks of the need for reworks.

Furthermore, braking using the main control applies significant forces to the shoes which need to maintain good friction face geometry in order to maintain effective braking. Measurements have demonstrated that the cut-out 90 slightly increases the flexibility of the shoe 4 and allows stress to be distributed more uniformly through the web 16 by better distributing the forces through the material.

This greater flexibility may be of benefit particularly in reducing the brake squeal or brake chatter encountered under certain braking conditions.

The invention claimed is:

1. Drum brake shoe (4) comprising a rigid web (16) and a cylindrical part (8) that accepts a friction lining, characterized in that an interior edge of the web (16) has a cut-out (90) providing access to a brake cable (64) attachment end terminal (66) attached to a lever (50) comprising a cable-accommodating duct (60) formed with an inclined edge (62) which diverges from an axis (A) of the duct (60) towards a drum, the lever (50) also comprising a ferrule (70) for guiding the end terminal (66) when the cable (64) is being fitted, and an elastic leaf (74) capable of pushing the end terminal (66) as the end terminal (66) leaves the ferrule (70) so as to house and hold part of the cable (64) in place in the closed end of the duct (60), in that the lever (50) has an outer edge, and in that the cut-out (90) has a depth outwardly beyond the outer edge of the lever (50) proximate an axial end (80) of the duct (60) to provide access to the end terminal (66) when attached to the lever (50).

2. Drum brake shoe according to claim 1, characterized in that the cut-out (90) is near one end (20) of the shoe (4) which is capable of pivoting by bearing against a stop (24) borne by a backplate (2) of a drum brake.

3. Drum brake shoe according to claim 2, characterized in that one side of the cut-out (90) meets the end (20) of the shoe.

4. Drum brake shoe according to claim 1, characterized in that the cut-out (90) has inclined sides such that an open end of the cut-out (90) is wider than a closed end thereof.

5. Drum brake shoe according to claim 1, characterized in that the web (16) has a width, and in that the cut-out (90) has a depth extending over approximately half the width of the web (16).

6. Drum brake shoe according to claim 1, characterized in that the cut-out (90) has a length at least equal to its depth.

7. Drum brake shoe according to claim 1, characterized in that the cut-out (90) has a depth outwardly beyond the axial end (80).

8. Drum brake shoe according to claim 1, characterized in that the cut-out (90) has a depth outwardly beyond at least a portion the end terminal (66) when attached to the lever (50).

9. Drum brake comprising a shoe (4) including a rigid web (16) and a cylindrical part (8) that accepts a friction lining, characterized in that an interior edge of the web (16) has a cut-out (90) providing access to a brake cable (64) attachment end terminal (66) attached to a lever (50) comprising a cable-accommodating duct (60) formed with an inclined edge (62) which diverges from an axis (A) of the duct (60) towards a drum, the lever (50) also comprising a ferrule (70) for guiding the end terminal (66) when the cable (64) is being fitted, and an elastic leaf (74) capable of pushing the end terminal (66) as the end terminal (66) leaves the ferrule so as to house and hold part of the cable (64) in place in the closed end of the duct (60), in that the lever (50) has an outer edge, and in that the cut-out (90) has a depth outwardly beyond the outer edge of the lever (50) proximate an axial end (80) of the duct (60) to provide access to the end terminal (66) when attached to the lever (50).

10. Drum brake according to claim 9, characterized in that one end of the lever (50) is connected by a pivoting connection (52) to that end of the shoe (4) on which a main cylinder-actuated control (30) acts, the brake cable (64) being attached to the other end of the lever (50).

11. Drum brake according to claim 10, characterized in that the brake cable (64) slides in a sheath having end which bears against a backplate (2) of the drum brake and the end terminal (66) can be attached to the lever (50) blind when the drum is mounted on the backplate.

12. Drum brake according to claim 9, characterized in that the cut-out (90) has a depth outwardly beyond the axial end (80).

13. Drum brake according to claim 9, characterized in that the cut-out (90) has a depth outwardly beyond at least a portion the end terminal (66) when attached to the lever (50).

* * * * *